United States Patent [19]

Spanton et al.

[11] Patent Number: 4,711,500
[45] Date of Patent: Dec. 8, 1987

[54] STABILIZING APPARATUS FOR A DUMP VEHICLE

[76] Inventors: David J. Spanton, 3464 Westlake Rd., Wilson, N.Y. 14172; Martin Schulze, 2064 Old Coomer Rd., Burt, N.Y. 14028

[21] Appl. No.: 933,392
[22] Filed: Nov. 24, 1986
[51] Int. Cl.$^4$ .............................................. B60P 1/16
[52] U.S. Cl. .................................. 298/17 S; 298/17 B; 298/17 SG
[58] Field of Search ................ 217/60 E, 60 F, 60 R; 280/475; 292/338; 298/17 B, 17 S, 17 MT, 17 SG; 414/495, 498

[56] References Cited

U.S. PATENT DOCUMENTS

| | | | |
|---|---|---|---|
| 3,419,169 | 12/1968 | James | 280/475 X |
| 3,921,128 | 11/1975 | Snead | 298/175 X |
| 3,985,254 | 10/1976 | Grandury | 414/498 |
| 4,090,623 | 5/1978 | Noyon | 414/498 X |
| 4,136,909 | 1/1979 | Duttarer | 298/17 B |
| 4,531,882 | 7/1985 | Pierre | 280/475 X |

FOREIGN PATENT DOCUMENTS

712282 1/1980 U.S.S.R. ........................ 298/17 SG

Primary Examiner—Leslie J. Paperner
Assistant Examiner—Janice Krizek
Attorney, Agent, or Firm—Christel, Bean & Linihan

[57] ABSTRACT

Stabilizing apparatus for a dump vehicle including a dump box pivotally movable about a frame between lowered and elevated conditions utilizes two leg members each having two end sections which are movable relative to one another in a telescoping fashion and hydraulic cylinders for telescopically moving the end sections of each leg members relative to one another. One end of each leg member is connectable to the dump box adjacent a corresponding side thereof for pivotal movement relative thereto between a first condition at which the leg member is positioned generally alongside the box for storage and a second condition at which the leg member extends angularly downwardly from the box for engagement of the other end section of the leg member with the ground. The hydraulic cylinders telescopically move the end sections of the leg member as the dump box is moved relative to the frame between the lowered and elevated conditions so that the other end section of the leg member is maintained in engagement with the ground as the dump box is moved relative to the frame so that the leg members brace the dump vehicle against forces which tend to tip the dump vehicle upon one of its sides.

25 Claims, 11 Drawing Figures

STABILIZING APPARATUS FOR A DUMP VEHICLE

BACKGROUND OF THE INVENTION

This invention relates generally to dump vehicles and more particularly is concerned with apparatus for stabilizing the dump vehicle during a dumping operation.

The type of vehicle with which this invention is concerned includes a frame, a dump box having opposite front and rear ends and lift means. The dump box is supported by and connected to the frame adjacent the rear end thereof for pivotal movement relative thereto between a lowered condition at which both ends of the dump box are positioned relatively low in relationship to the frame and an elevated condition at which the front end of the dump box is positioned relatively high in relationship to the frame. The lift means act between the dump box and the frame for pivoting the dump box relative to the frame between the lowered and elevated conditions and commonly is in the form of a hydraulic hoist. The dump box is in condition for collecting and transporting a load when positioned in the lowered condition and is in condition for discharging a load through the rear end thereof when positioned in the elevated condition.

When moved to the elevated condition, the front end of the dump box is commonly positioned at such a high elevation in relationship to the width of the vehicle that the dump vehicle is relatively unstable and susceptible to tipping over upon one of its sides if exposed to a relatively small amount of lateral forces applied to one side of the box. Such a susceptibility to tipping over is compounded if the dump vehicle is parked upon uneven or soft ground or if a portion of the load being dumped sticks within the box in such a manner that one side of the vehicle is rendered heavier than the other side. If the vehicle turns over, significant and costly damage to the vehicle and/or property adjacent the vehicle can result.

It is an object of the present invention to provide new and improved apparatus for stabilizing a dump vehicle during a dumping operation and thereby enhancing the safety of a dumping operation performed with the vehicle.

Another object of the present invention is to provide such an apparatus which is hydraulically operated and easy to use.

Still another object of the present invention is to provide such an apparatus including leg members for effectively bracing the vehicle against forces which tend to tip the vehicle upon one of its sides.

Yet still another object of the present invention is to provide such an apparatus having leg members for bracing opposite sides of the dump vehicle and which are operable independently of one another.

A further object of the present invention is to provide such an apparatus facilitating the dumping of a load.

A still further object of the present invention is to provide such an apparatus for effectively shaking a vehicle when a dump vehicle thereof is arranged in an elevated condition to thereby loosen a load contained therein.

A yet still further object of the present invention is to provide such an apparatus which is economical to manufacture and effective in operation.

SUMMARY OF THE INVENTION

This invention resides in stabilizing apparatus for a dump vehicle including a frame, an elongated dump box supported by and connected to the frame for pivotal movement relative thereto between a lowered condition at which both ends of the dump box are positioned relatively low in relationship to the frame and an elevated condition at which one end of the dump box is positioned relatively high in relationship to the frame, and means for pivoting the dump box relative to the frame between the lowered and elevated conditions.

The stabilizing apparatus includes at least one leg member having two end sections connected to one another for telescopic movement and hydraulic means for moving the end sections in a telescoping fashion. One end section of the leg member is pivotally connectable to the dump box adjacent one side thereof for pivotal movement relative thereto between a first condition at which the leg member is positioned generally alongside the box for storage and a second condition at which the leg member extends angularly downwardly from the box for engagement of the other end section with the ground. The hydraulic means telescopically moves the end sections of the leg member as the dump box is pivoted between the lowered and elevated conditions so that the other end section is maintained in engagement with the ground as the dump box is moved as aforesaid so that the leg member effectively braces the dump vehicle against forces which tend to tip the dump vehicle upon one of its sides.

DETAILED DESCRIPTION OF AN ILLUSTRATIVE EMBODIMENT

Figure 1:
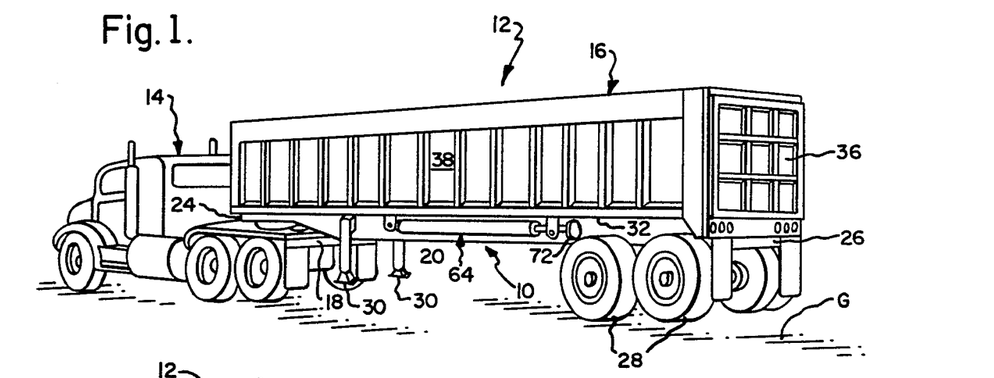
FIG. 1 is a perspective view of an apparatus in accordance with the present invention shown operatively attached to a dump vehicle.
Figure 2:
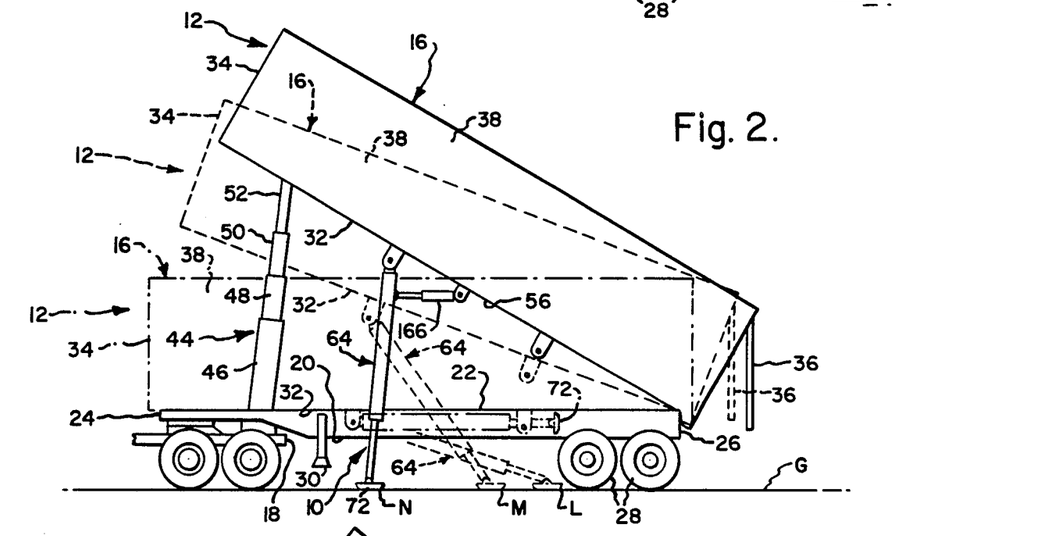
FIG. 2 is a fragmentary elevation view of the dump vehicle of FIG. 1 illustrating the positioning of the apparatus leg members relative to the dump vehicle as the dump box is moved between a lowered condition and a partially-elevated condition.
Figure 3:
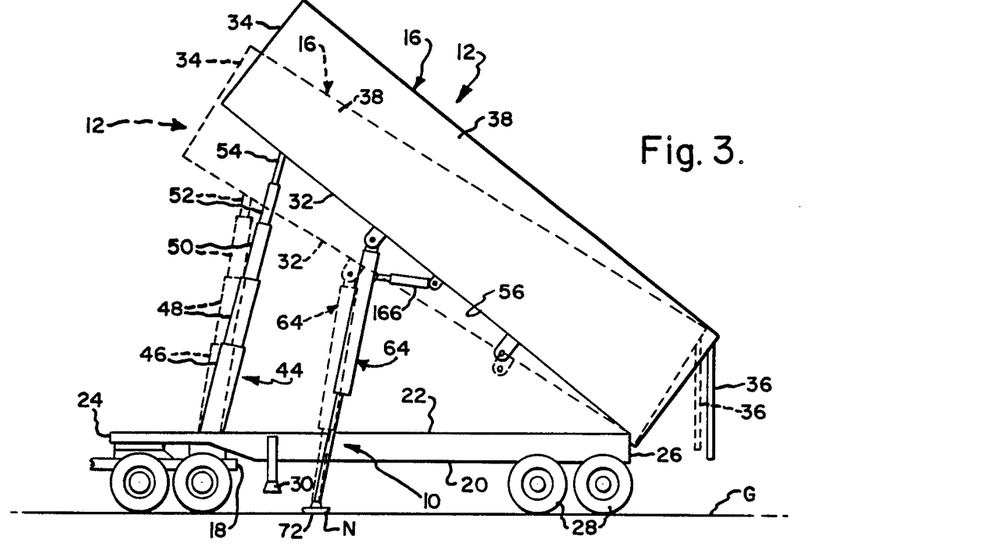
FIG. 3 is a fragmentary elevation view of the dump vehicle of FIG. 1 illustrating the contracted and extended conditions of the apparatus leg members as the dump box is moved between a partially-elevated condition and a fully elevated condition.

Turning now to the drawings in greater detail and considering first FIGS. 1–3, there is illustrated stabilizing apparatus, generally indicated 10, in accordance with the present invention shown operatively attached to a dump vehicle 12. The dump vehicle 12 includes a dump box 16 in the form of a generally upwardly-opening receptacle for receiving and retaining a load and is of a type adapted to be attached as shown in FIG. 1 to a highway tractor 14 for purposes of pulling the vehicle 12 from one job site to another. During loading or transport of the vehicle 12, the dump box 16 is positioned in a lowered condition as shown in FIG. 1 and during an unloading or dumping operation, the dump box 16 is canted to an inclined condition as shown in solid lines FIG. 3. As will be explained in greater detail hereinafter, the apparatus 10 is adapted to act between the dump box 16 and the ground, indicated G, for stabilizing the vehicle 12 when the box 16 is moved into and out of or maintained in the FIG. 3 inclined condition.

The dump vehicle 12 includes an elongated frame 20 comprised of steel rails so joined and arranged relative to one another so as to collectively define a generally planar, upwardly-directed support surface 22. The elongated frame 20 defines a front end portion 24 and an opposite rear end portion 26 and is supported in a generally parallel relationship with the ground G by the back, indicated 18, of the tractor 14 and the rear wheels, indicated 28, of the vehicle 12. As best shown in FIG. 1, the rear wheels 28 are arranged generally beneath the rear end portion 26 of the frame 20 and the back 18 of the tractor 14 is positioned beneath and hitched to the front end portion 24 of the frame 20. Connected to opposite sides of the frame 20 adjacent the front end portion 24 are a pair of manually-operated jacks 30 for supporting the front end portion 24 without the tractor 14. When the jacks 30 are used to support the front end portion 24 in spaced relationship with the ground G in a manner well-known in the art, the tractor 14 can be unhitched from and driven out from beneath the front end portion 24.

Figure 4:
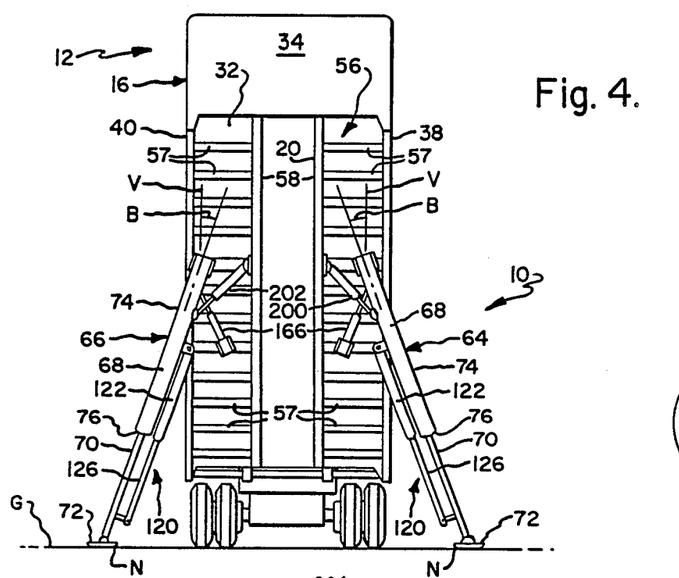
FIG. 4 is an elevation view of the FIG. 1 apparatus and dump vehicle as seen from the left in FIG. 3.

With reference to FIGS. 1 and 4, the dump box 16 includes a support floor 32, a front 34, a back 36 and two opposite sides 38,40 extending between the front 34 and back 36. As shown in FIG. 1, the back 36 of the dump box 16 is closed and securable to the remainder of the box 16 so as to provide a stationary back wall for the box 16 and can be pivoted or swung from the aforesaid wall-providing condition to an open condition as shown in FIG. 3 for purposes of discharging a load through the rear of the dump box 16. The dump box 16 further includes framework 56 attached to the underside of the support floor 32 including a pair of elongated rails 58,58 extending between the front and rear portions 24 and 26 for positioning outboard of the rails of the vehicle frame 20 when the box 16 is positioned in the FIG. 1 lowered condition and a plurality of transversely-extending channel members 57,57.

With reference again to FIGS. 1–3, the dump box 16 is pivotally secured to the vehicle frame 20 adjacent the rear end thereof for pivotal movement of the box 16 relative thereto between a lowered condition as shown in FIG. 1 at which the front 34 of the dump box 16 rests upon the front end portion 24 of the frame 20 and an elevated condition as shown in solid lines in FIG. 3 at which the front 34 of the dump box 16 is positioned in an elevated relationship with the frame 20. The dump box 16 is pivotally attached to the frame 20 by means of a pivot pin (not shown) so that movement of the box 16 between the FIG. 1 lowered condition and the FIG. 3 elevated condition pivots the box 16 about a pivotal axis which is oriented generally transversely of the vehicle 12 and parallel to the ground G so that movement of the dump box 16 between the lowered and elevated conditions swings the front 34 of the box 16 upwardly or downwardly relative to the frame 20. When the box 16 is raised to the FIG. 3 elevated condition, of course, a load contained therein is gravationally biased toward the back 36 of the box 16.

Figure 10:
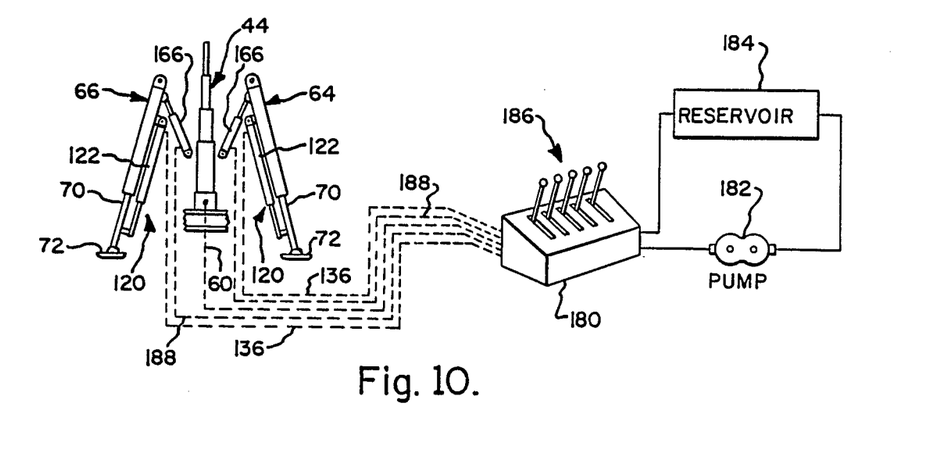
FIG. 10 is a view of the underside of the FIG. 1 apparatus and vehicle as seen generally from the left as shown in FIG. 3 illustrating schematically the control of the hydraulically-operated cylinders of the apparatus and vehicle.

As best shown in FIGS. 2–4, the dump vehicle 12 further includes a hydraulic hoist 44 for moving the box 16 between the FIG. 1 lowered condition and the FIG. 3 elevated condition. The hoist 44 includes an outer cylinder 46 and a plurality of telescoping inner cylinders 48,50, 52 and 54 adapted to increase or decrease the length of the hoist 44 as the hoist 44 is actuated. The outer cylinder 46 is hingedly connected at its base to the front end portion 24 of the frame 20 and the innermost hoist cylinder, indicated 54, is hingedly connected at its upper end to the underside of the support floor 32 of the dump box 16 adjacent the front 34 thereof so that the lengthening of the hoist 44 raises the front 34 of the box 16 from the FIG. 1 lowered condition toward the FIG. 3 elevated condition, and the shortening of the hoist 44 lowers the box front 34 from the FIG. 3 elevated condition toward the FIG. 1 lowered condition. The actuation of the hoist 44 is effectuated by a hydraulic pump, indicated 182 in FIG. 10, mounted within the tractor 14 and hoses 60 (FIG. 10) connected between the hoist 44 and pump 182. Hydraulic controls including a spool-type valve, indicated 180 in FIG. 10, are connected in flow communication with the hoses 60 and are suitably mounted on the tractor 14 in a position accessible to an operator for controlling the actuation of the hoist 44.

In accordance with the present invention and with reference to FIGS. 1–4, the stabilizing apparatus 10 includes means for acting between the dump box 16 and ground G and to thereby stabilize the dump vehicle 12 when the box 16 is positioned in the FIG. 3 elevated condition. Such acting means of the apparatus 10 includes a pair of leg members 64,66 which are pivotally attached to the dump box 16 on opposite sides thereof and are each engageable with the ground G. As exemplified by the leg member 64 of FIG. 5, each leg member 64 or 66 includes two elongated sections 68 and 70 connected for telescoping movement therebetween with one section 68 slidably receiving the other section 70. One end section 68 of each leg member 64 or 66 is pivotally secured to the floor 32 of the dump box 16, and the other section 70 of each leg member 64 or 66 includes a cylindrical part 71 and a pad 72 attached to the free end thereof providing a ground-engaging foot for the leg member 64 or 66.

Figure 5:
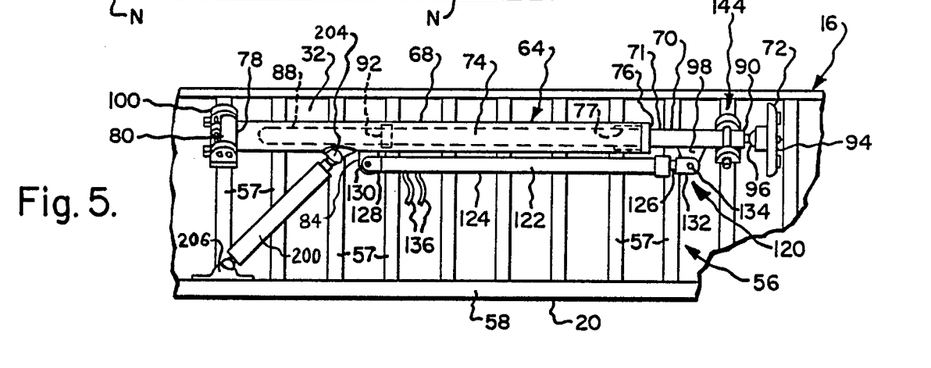
FIG. 5 is a fragmentary elevation view of a portion of the FIG. 1 apparatus and vehicle as seen generally from below in FIG. 2.

As best shown in FIG. 5, the section 68 of each leg member 64 or 66 includes a cylindrical sleeve part 74 defining an open sleeve end 76 and a boss-like part 78 attached to the opposite end of the cylindrical part 74 to form an attachment end 80 of the leg member 64 or 66. The sleeve end 76 includes an inwardly-directed flange 77 for a reason which will be hereinafter apparent. The boss-like part 78 is oriented generally perpendicular to the longitudinal axis of the cylindrical part 74 and defines a through-opening extending generally transversely of the section 68. Attached, as with welds, to one side of the sleeve part 74 is a lug 84 defining an aperture therethrough for a reason which will be hereinafter apparent.

The elongated cylindrical part 71 of each leg member section 70 defines two opposite end sections 88 and 90 as best shown in FIG. 5. One end section 88 is received by the sleeve end 76 of the leg section 68 so that the leg section 70 is permitted to slide relative to and along the length of the leg section 68 in a telescoping fashion. Attached about the end section 88 is a ring member 92 which cooperates with the inwardly-directed flange 77 of the sleeve end 76 when the corresponding leg member 64 or 66 is fully extended to prevent the section 68 from being completely removed from the section 70. Attached, as with welds, to one side of the cylinder part 71 is a lug 98 defining a through-aperture for a reason which will be apparent hereinafter.

Figure 6:
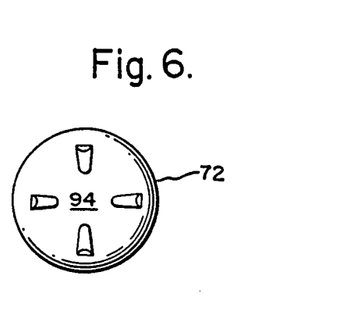
FIG. 6 is an end elevational view of a ground-engaging pad of the FIG. 1 apparatus as seen generally from the right in FIG. 5.

With reference to FIGS. 5 and 6, the foot pad 72 is relatively broad and flat in shape so as to define a generally planar ground-engaging surface 94 which is circular in outline. The pad 72 is attached to the end section 90 by means of a ball joint 96 so as to permit the pad 72 to pivot about the end section 90 through a relatively broad range of movement. As will be apparent hereinafter, the ball joint 96 permits the ground-engaging surface 94 to remain flat against the ground G throughout the period of a dumping operation during which the dump box 16 is moved between the FIG. 2 partially-elevated condition and the FIG. 3 fully-elevated condition.

In accordance with the present invention and with reference still to FIG. 5, the apparatus 10 includes hydraulic means, generally indicated 120, for slidably moving each leg section 70 relative to and along the length of its corresponding leg section 68 so that the leg member sections 68,70 move in a telescoping fashion to thereby selectively increase or decrease the length of the leg members 64,66. Such hydraulic means 120 for slidably moving includes a pair of hydraulic cylinders 122 (only one shown in FIG. 5) for acting between the leg member sections 68 and 70 and thereby moving the leg sections 68 and 70 in a telescoping fashion. Each hydraulic cylinder 122 includes a housing portion 124 securely attached to the leg section 68 and a ram 126 slidably received by the housing 124 and securely attached to the leg section 68. The housing portion 124 defines aperture-defining lugs at one end, indicated 128, thereof and is suitably joined to the section lug 84 by means of a drawbar pin 130 extending through aligned openings in the section lug 84 and lugs of the housing 124. The ram 126 includes a bifuricated end portion 132 having forks defining aligned through-apertures and which are suitably attached to the lug 98 of the leg section 70 by means of a drawbar pin 134 which extends through and is secured within aligned openings of the ram end portion 132 and the lug 98. For purposes of actuating the cylinder 122, there operatively extends between the housing 124 and the hydraulic pump 182 (FIG. 10) an associated a pair of hydraulic hoses 136. By appropriately actuating the cylinder 122 in a manner described in greater detail hereinafter, the leg member section 70 is forced to telescopically move relative to the leg section 68 to thereby lengthen or decrease the length of the corresponding leg member 64 or 66.

Figure 7:
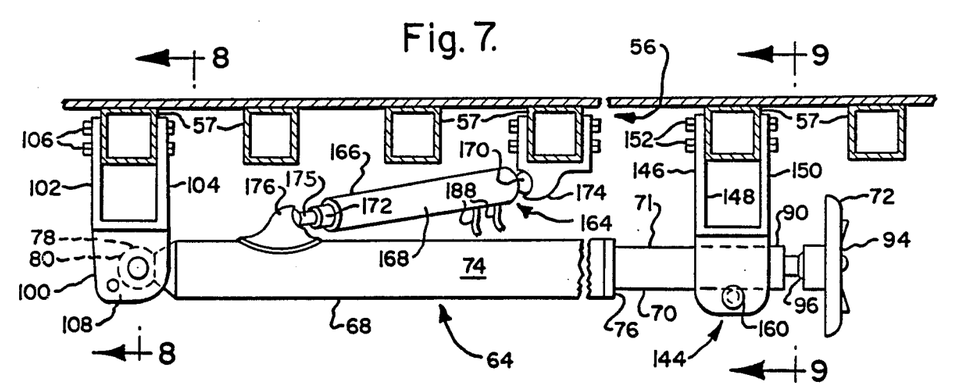
FIG. 7 is a fragmentary view, shown partially in section, of a portion of the FIG. 1 apparatus and dump body as seen in FIG. 2 but drawn to a slightly larger scale.
Figure 8:
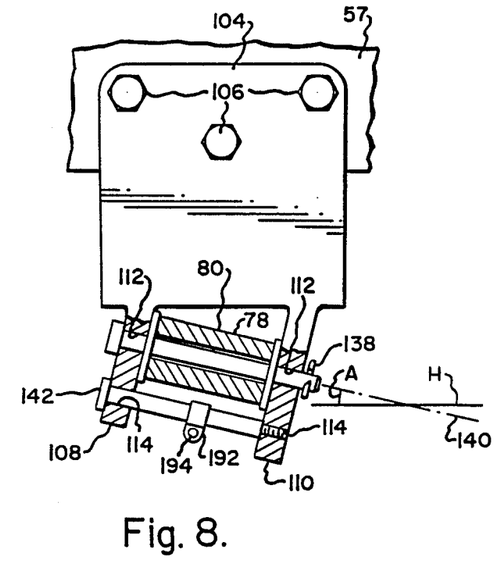
FIG. 8 is a cross sectional view taken about on line 8—8 of FIG. 7.

For purposes of pivotally attaching the leg member 64,66 to the supporting floor 32 of the dump box 16 and with reference to FIGS. 5, 7 and 8, the apparatus 10 includes a pair of securement bodies 100 (only one shown) and attached to opposite sides of the dump box 16 and generally beneath the floor 32. Each body 100 includes a pair of flanges 102,104 for positioning on opposite sides of one of the floor support channels 57 and defining a plurality of aligned through-openings for attachment of the body 100 to the channel 57 with bolts 106. Each body 100 further includes a pair of spaced and parallel planar lugs 108,110 of such orientation relative to the remainder of the body 100 that when the body 100 is operatively attached to the floor channel 57 as shown, the plane of each lug 108 or 110 is oriented at an acute angle with the vertical when the dump vehicle 12 is viewed endwise and theretoward. The lugs 108,110 further define two pairs of aligned openings 112,112 and 114,114 so arranged that the axial centerline of each opening pair 112, 112 or 114, 114 is generally perpendicular to the plane of each lug 108 or 110. Each securement body 100 is preferably constructed of steel, and as best shown in FIG. 2, is attached to a channel 57 positioned forwardly of the midway point along the length of the floor 32.

As best shown in FIGS. 5 and 8, the attachment end portion 80 of each leg section 68 is positioned between the lugs 108, 110 of the body 100 so that the through-opening of the boss-like part 78 is aligned with the pair of openings 112,112 defined in the lugs 108,110. For pivotally securing the attachment end 80 to the body 100, a drawbar pin 134 is received by the aligned openings in the attachment end 80 and the lugs 108,110 and secured therein by means of a key 138.

The pin 134 provides the pivot pin about which a leg member 64 or 66 is permitted to pivot relative to the body 100 and dump body 16. Because of the aforedescribed arrangement of the lugs 108,110 and the opening pair 112,112 defined therein, the axis of pivot of each leg member 64 or 66 relative to the dump body 16, which pivot axis is exemplified by axis 140 in FIG. 8, is oriented at an acute angle, indicated A, with the horizontal, indicated H. In the apparatus embodiment 10 and as best shown in FIG. 8, the acute angle A defined by the pivot axis 140 and the horizontal and is about fifteen degrees.

In further accordance with the present invention and with reference still to FIG. 8, an additional drawbar pin, indicated 142, is inserted through and secured within the opening pair 114 of the lugs 108 and 110. The drawbar pin 142 provides means for limiting the pivotal or swinging movement of a leg member 64 or 66 relative to the dump body 16 in the pivotal direction away from the FIG. 1 stowed condition.

The aforedescribed attachment between the leg member 64 and body 100 permits the leg member 64 to pivot relative to the dump body 16 between a stowed condition, as shown in FIGS. 1 and 7, at which the leg member 64 is arranged generally alongside the dump body 16 and a ground-engaging condition as shown in solid lines in FIG. 2. In the latter ground-engaging condition, the leg member 64 is positioned in abutting engagement with the drawbar pin 142 to prevent further pivotal movement of the leg member 64 about the pivot pin 134 in one pivotal direction, or further movement in a clockwise direction as shown in FIG. 2, is prevented.

With reference to FIGS. 4 and 5, the stabilizing apparatus 10 further includes a pair of struts 200,202 each associated with a corresponding side of the dump box 16 for strengthening the leg members 64,66 when the leg members 64,66 are positioned in the ground-engaging condition. As exemplified by the strut 200 of FIG. 5, each strut is fixed in length and is connected at its opposite ends to a corresponding leg member 64 or 66 and a floor rail 58 by means of universal or ball joints 204,206 operatively connected to the corresponding leg member or rail 58. The ball joints 204,206 permit the struts 200,202 to appropriately pivot relatively to the floor rail 58 and as the leg member 64,66 are swung between the FIG. 1 stowed condition and the FIG. 2 ground-engaging (soid line) condition. It will be understood that when the leg memebrs 64,66 are positioned in the FIG. 2 ground-engaging condition, the fixed-length struts 200,202 strongly resist forces which may tend to bend the leg members 64,66 during a dumping operation and thereby effectively brace the leg members 64,66.

Figure 11:
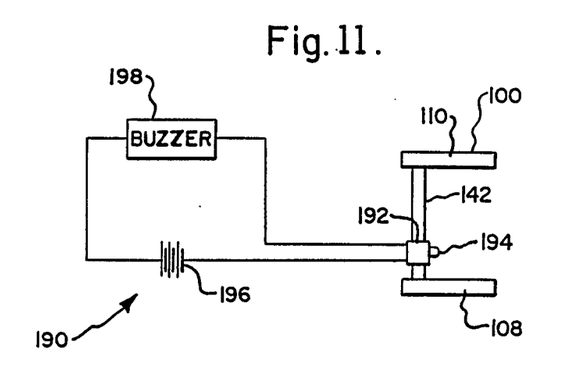
FIG. 11 is a view illustrating schematically the interconnection between components of the audible signaling means of the FIG. 1 apparatus.

In accordance with the present invention and with reference to FIGS. 8 and 11, the apparatus 10 includes means, generally indicated 190, for providing an audible indication of the abutting engagement between the leg member 64 or 66 and the drawbar pin 142 to audibly indicate or warn an operator that the leg member 64 or 66 has been pivotally moved to its ground-engaging condition. To this end, the indication means includes a switch 192 having a depressible plunger 194, a battery 196, and a buzzer 198 operatively associated with each securement body 100. The battery 196, buzzer 198 and switch 192 are operatively wired together so that the depressing of the plunger 194 activates the buzzer 198 and the release of the plunger 194 deactivates the buzzer. While the buzzer 198 and battery 196 can be suitably supported atop a platform attached to a channel 57, the switch 192 is attached to the drawbar pin 142 so that its plunger 194 is directed generally toward the leg member end section 68. Therefore, the movement of the leg member 64 or 68 into or out of engagement with the drawbar pin 142 activates or deactivates, respectively, the buzzer 198.

Figure 9:
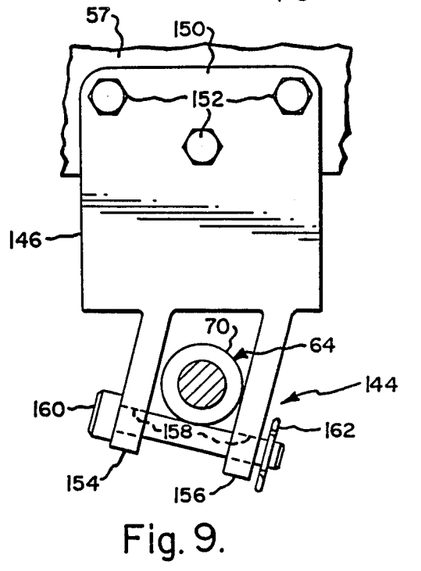
FIG. 9 is a cross sectional view taken about on lines 9—9 of FIG. 7.

With reference to FIGS. 7 and 9, and in accordance with the present invention, the apparatus 10 further includes means, generally indicated 144, positioned on each side of the dump box 16 for releasably securing the leg members 64,66 in the stowed condition. The securing means 144 includes a securement body 146 of steel including two spaced and parallel flanges 148,150 for positioning on opposite sides of one of the floor channels 57 and defining a plurality of aligned through-openings for attachment of the body 146 to the channel 57 with bolts 152. Each body 146 further includes a pair of spaced and parallel planar lugs 154,156 of such orientation relative to the remainder of the body 146 that when the body 146 is operatively attached to the floor channel 57 as shown in FIG. 9, the planes of the lugs 154 and 156 are generally parallel to the planes of the lugs 108 and 110 of the securement body 100 located on the same side of the dump vehicle 12. The lugs 154,156 further define a pair of aligned openings 158,158 arranged so that the axial centerline of opening pair 158,158 is generally parallel to the axis of pivot 140 of the corresponding leg member 64 or 66. The aligned opening pair 158 of the lugs 154,156 is adapted to receive the shank of a drawbar pin 160 which is, in turn, secured therein by means of a key 162.

When a leg member 64 or 66 is positioned in the stowed condition and with reference still to FIG. 9, the leg section 70 is received by the space defined between the lugs 154 and 156 of the body 146 and generally above the aligned opening pair 158,158. The drawbar pin 160 is therefore oriented generally beneath the leg section 70 so as to provide a rest for the leg section 70 to thereby limit the downward swinging movement of the leg member 64 relative to the dump box 16 until such time as the leg member 64 is desired to be used for stabilizing the dump vehicle 12.

In accordance with the present invention and with reference to FIGS. 4 and 7, the apparatus 10 includes means generally indicated 164, for pivoting or swinging each leg member 64 or 66 relative to the dump box between the stowed condition as shown in FIG. 1 and the ground-engaging condition as shown in solid lines in FIG. 2. As best shown in FIG. 7, the pivoting means 164 includes a pair of hydraulic cylinders 166 (only one shown in FIG. 7) for acting between the dump box 16 and a corresponding leg member 64 or 66 for pivoting the leg member 64 or 66 between the aforedescribed stowed and ground-engaging conditions. Each hydraulic cylinder 166 includes a housing portion 168 having an end, indicated 170, secured to the dump box floor 32 and a ram 172 slidably received by the housing portion 168 and including an end portion, indicated 175, which is secured to a leg member section 68. The end 170 of the housing portion 168 is pivotally connected to the dump box 16 by means of a ball joint 174 having a base which is securely fixed to a support channel 57.

The end 175 of the ram 172 is pivotally attached to the leg section 68 by means of a ball joint 176 having a base which is fixedly secured, as with welds, to the leg section 68 adjacent the attachment end 80 thereof. The aforedescribed ball joint connection 174 and 176 between the hydraulic cylinder 166 and dump box 16 and leg section 68 permit pivotal movement between the joined components as the corresponding leg member 64 or 66 is moved between the stowed and ground-engaging conditions. As best shown in FIG. 5, the longitudinal axis of the hydraulic cylinder 166 is oriented in an angular relationship with the longitudinal axis of the leg section 68 so that linear actuation of the cylinder 166 forces the corresponding leg member 64 or 66 to pivot between the stowed and ground-engaging conditions. More specifically, an extending of the hydraulic cylinder 166 forces the corresponding leg member 64 or 66 to move from the stowed condition toward the ground-engaging condition while a retracting of the cylinder 166 forces the leg 64 to move from the ground-engaging condition toward the stowed condition. Each cylinder 166 is operatively connected to the spool-type valve 180 and hydraulic pump 182, introduced earlier, by means of hydraulic hoses 188.

With reference to the schematic view of FIG. 10, there is illustrated the spool-type valve 180 and hydraulic pump 182 shown operatively connected to the hydraulic cylinders of the apparatus 10 and hoist 44 of the dump vehicle 12 by means of appropriate hoses. The pump 182 is powered by the engine of the tractor 14, and there is included within the hydraulic circuit shown a hydraulic fluid reservoir 184 mounted within the tractor 14. The hoses 136,136,60, 188,188 are each detachable from the spool valve 184 for operative connection to another tractor.

It follows from the foregoing that each apparatus cylinder and the vehicle hoist 44 is controllable by appropriate manipulation of the control levers, indicated 186, of the spool-type valve 180. More specifically, appropriate manipulation of the control levers 186 adjust the length of the leg members 64 and 66, the pivotal orientation of the leg member 64 and 66 relative to the dump box 16 and the extension length of the hoist 44. Furthermore, each apparatus cylinder is adapted to extend or retract independent of gravitational effects which may tend to bias the cylinders toward either an extended or retracted condition. Hence, each apparatus cylinder is adapted to transmit power when extended and retracted.

The hydraulic circuit of the apparatus 10 is designed and constructed to permit operation of the leg member 64 or 66 independent of the other leg member 66 or 64 so that one leg member 64 or 66 can be used without the other leg member 66 or 64. The advantage provided by such a feature can be readily appreciated when the vehicle is parked in close proximity to the wall of a building so that the vehicle 12 cannot tip over upon the building-side of the vehicle 12. In such a circumstance, the apparatus leg member arranged on the building-side of the vehicle 12 can remain in its stowed condition and only the other leg member need be used for suitably stabilizing the vehicle 12 during a dumping operation.

The hydraulic circuit of the apparatus 10 is further designed and constructed to permit the adjustment of the leg member 64,66 in synchronism with the adjustment of the extension length of the hoist 44. Therefore, leg members 64 and 66 can be maintained in a stabilizing relationship with ground G while the front 34 of the box 16 is moved from a partially-elevated condition, shown in solid lines in FIG. 2, to a fully extended condition as illustrated in solid lines in FIG. 3.

With reference again to FIGS. 1–4 and 10 and at the outset of a dumping operation during which both leg members 64,66 are utilized, the drawbar pins 162 securing each leg member 64,66 in the FIG. 1 stowed condition are removed and the leg members 64,66 are pivoted downwardly by means of the hydraulic cylinders 166,166 so that the foot pads 72,72 arranged on opposite sides of the vehicle 12 engages the ground G at the location L (FIG. 2) along the length of the vehicle 12. With the foot pads 72,72 in engagement with the ground G, the hoist 44 is extended to raise the front 34 of the dump box 16 to a partially-elevated condition, shown in solid lines in FIG. 2. As the hoist 44 is raised to the FIG. 2 partially-elevated condition and as illustrated in FIG. 2, each foot pad 72 shifts forwardly relative to the dump vehicle 12 so as to move from the location L to the location N through the location M. In order to maintain the foot pads 72,72 in engagement with the ground G during the rasing of the dump box front 34 to the FIG. 2 solid line condition, the hydraulic cylinders 166,166 are extended while extension of the hoist 44 is extended.

When the dump box front 34 attains the FIG. 2 partially-elevated or solid line condition, each leg member 64 or 66 abuts a corresponding drawbar pin 142 to halt the forward shifting of its foot pad 72 relative to the ground G. At that point, the hoist 44 is raised from the FIG. 2 solid line condition to the fully-elevated condition, indicated in solid lines in FIG. 3, and the leg members 64 and 66 are lengthened by means of the hydraulic cylinders 122 to maintain the foot pads 72,72 in engagement with the ground G. As the dump box front 34 approaches the FIG. 3 fully-elevated condition, the foot pads 72,72 are not believed to shift in location relative to the ground G.

The steps involved in lowering the dump box front 34 from the FIG. 3 fully-elevated condition to the FIG. 1 lowered condition include the reversal of the steps involved in raising the dump box front 34 from the lowered condition to the fully-elevated condition. More specifically, the hoist 44 is retracted in length to lower the dump box front 34 from the fully-elevated condition to the FIG. 2 partially-elevated condition while the length of the leg members 64 and 66 are shortened by means of the hydraulic cylinders 122,122 and the hydraulic cylinders 166,166 are actuated to swing the leg members 64 and 66 from the ground-engaging condition to the FIG. 1 stowed condition as the hoist 44 is retracted to lower the dump box front 34 from the FIG. 2 partially-elevated condition to the lowered condition.

With reference to FIG. 4 there is shown the dump box front 34 being positioned in the fully-elevated condition and both of the leg members 64 and 66 being positioned in engagement with the ground G. With the leg members 64,66 in operative engagement with the ground G as shown in FIG. 4, the longitudinal axis of each leg member 64 or 66 defines an acute angle, indicated B, with the vertical indicated V. In the vehicle 12 and apparatus 10 illustrated, the acute angle B is about fifteen degrees. It is believed that such an angular relationship between each of the leg members 64,66 and the vertical enhances the stability of the dump vehicle 12 when the dump box 16 is positioned in its fully-elevated condition.

It will be understood that numerous modifications can be had to the aforedescribed embodiment without departing from the spirit of the invention. For example, although the hydraulic cylinders 166,166 have been each shown and described above as being pivotally connected to the dump box floor 32 at a location generally between a securement body 100 and the back 36 of the dump box 16, the cylinders 166,166 can each be pivotally connected to the dump box floor 32 at a location generally between a securement body 100 and the front 34 of the dump box 16. Accordingly, the aforementioned embodiment 10 is intended for purposes of illustration and not as limitation.

We claim:

1. Stabilizing apparatus for a dump vehicle having a frame, an elongated dump box supported by and connected to the frame for pivotal movement relative thereto between a lowered condition in which both ends of the dump box are positioned relatively low in relationship to the frame and an elevated condition in which one end of the dump box is positioned relatively high in relationship to the frame and means for pivoting the dump box relative to the frame between the lowered and elevated conditions, said apparatus comprising:

at least one leg member having two end sections connected to one another for telescopic movement, one of said end sections being connectable to the dump box adjacent one side thereof for pivotal movement relative thereto between a first condition in which the leg member is positioned generally alongside the box for storage and a second condition in which the leg member extends angularly downwardly from the box for engagement of the other end section of the leg member with the ground; and hydraulic means for telescopically moving the end sections of the leg members relatively to one another as the dump box is moved relative to the frame between the lowered and elevated conditions so that said other end section is maintained in engagement with the ground as the dump box is moved as aforesaid so that said leg member braces the dump vehicle against forces which tend to tip the dump vehicle upon one of its sides.

2. Stabilizing apparatus as defined in claim 1 further comprising means for pivotally connecting said one end section of said leg member to the dump box so that when the dump box is positioned in said lowered condition, the axis of pivot about which said one end section and the dump box can pivotally move relative to one another is oriented in a vertical plane and defines a first acute angle with the horizontal when the dump vehicle is viewed endwise and theretoward.

3. Stabilizing apparatus as defined in claim 2 wherein said first acute angle is about fifteen degrees.

4. Stabilizing apparatus as defined in claim 2 wherein said means for connecting includes a body connectable to said dump box in a fixed relationship therewith and means for pivotally connecting said one end section of the leg member to said body for pivotal movement relative to said body.

5. Stabilizing apparatus as defined in claim 1 further comprising means for releasably securing said leg member in said first condition for storage.

6. Stabilizing aparatus as defined in claim 5 wherein said means for releasably securing includes means for releasably securing said other end section of said leg member in relatively close proximity to the dump box.

7. Stabilizing apparatus as defined in claim 5 wherein said means for releasably securing said leg member includes a securement body connectable to said dump box in a fixed relationship therewith and includes means associated with said securement body for releasably maintaining said other end section is relatively close proximity to said dump box and thereby releasably securing said leg member in said second condition.

8. Stabilizing apparatus as defined in claim 1 wherein said hydraulic means includes means for coordinating the telescoping movement of said leg member in cooperation with the movement of dump box as the dump box is moved between said lowered and elevated conditions.

9. Stabilizing apparatus as defined in claim 1 wherein said hydraulic means includes a first hydraulic cylinder for telescopically moving said leg member end sections and said stabilizing apparatus further includes a second hydraulic cylinder for pivotally moving the leg member between said first and second conditions.

10. Stabilizing apparatus as defined in claim 1 further comprising means for limiting the pivotal movement of said leg member as said leg member is moved from said first condition to the position said leg member occupies when in said second condition.

11. Stabilizing apparatus as defined in claim 1 further comprising means for pivotally connecting said one end section of said leg member to the dump box so that when the leg member is positioned in said second condition and the dump box is positioned in said elevated condition, said leg member defines a first acute angle with the vertical when the dump vehicle is viewed endwise and theretoward to enhance the bracing of said one side of the dump vehicle.

12. Stabilizing apparatus as defined in claim 11 wherein said first acute angle is about fifteen degrees.

13. Stabilizing apparatus as defined in claim 1 wherein there are two leg members for arrangement on opposite sides of the dump box and said hydraulic means includes means for telescopically moving the end sections of each leg member as the dump box is moved relative to the frame so that when said leg members operatively engage the ground and the dump box is positioned in the elevated condition, the leg members effectively brace the dump vehicle for resisting a tipping of the dump box upon either of its sides.

14. Stabilizing apparatus as defined in claim 13 wherein each of said leg members is pivotally connectable to the dump box so that when the dump box is positioned in the elevated condition and the leg members operatively engage the ground, each of the leg members forms a first acute angle with the vertical when the dump vehicle is viewed endwise and theretoward.

15. Stabilizing apparatus as defined in claim 14 wherein said first acute angle is about 15 degrees.

16. Stabilizing apparatus as defined in claim 13 further including means for telescopically moving the end sections of one leg member independently of the end sections of the other leg member so that said one leg member can be used independently of said other leg member for bracing the dump vehicle.

17. Stabilizing apparatus for a dump vehicle as defined in claim 1 further comprising means for generating an audible signal to indicate to an operator that the leg member is positioned in the second condition.

18. Stabilizing apparatus for a dump vehicle including an elongated frame having a front end portion and a rear end portion, and elongated dump box supported by the frame and having a front end portion and a rear end portion which correspond respectively with the front and rear end portions of the frame, means pivotally connecting the rear end portions of the frame and dump box together for pivotal movement of the dump box relative to the frame between a lowered condition in which the front end portion of the dump box is lowered upon the front end portion of the frame and an elevated condition in which the front end portion of the box is elevated from the front end portion of the frame, and lift means for acting between the dump box and the frame for pivotally moving the dump box relative to the frame between the lowered and elevated conditions, said apparatus comprising:

two leg members for arrangement on opposite sides of the dump box and each having two opposite end sections connected for telescopic movement relative to one another to thereby shorten and lengthen the leg members, one of said end sections of each leg member being pivotably connected to the dump box adjacent a corresponding side thereof so that the leg members can be pivotally moved relative to the dump box between a first condition in which the leg members are positioned generally alongside the box for storage and a second condition in which said leg members extend angularly downwardly from said box for engagement of the other end section of each leg member with the ground; and hydraulic means for moving each end section of each leg member relatively to each other in a telescoping fashion and maintaining the leg members in engagement with the ground for bracing the dump vehicle as the dump box is moved between the lowered and elevated conditions.

19. A dump vehicle comprising:

an elongated frame having a front end portion and a rear end portion;

an elongated dump box supported by the frame and having front end and rear end portions which correspond respectively with the front and rear end portions of the frame;

means pivotally connecting the rear end portions of the frame and dump box together for pivotal movement of the dump box relative to the frame between a lowered condition in which the front end portion of the dump box is lowered upon the front end portion of the frame and an elevated condition in which the front end portion of the box is elevated from the front end portion of the frame;

lift means for pivotally moving the dump box relative to the frame and the lowered and elevated conditions; and stabilizing apparatus including at least one leg member having two end sections connected to one another for telescopic movement therebetween and hydraulic means for telescopically moving the end sections relative to one another, one of said end sections being pivotally connected to the dump box adjacent one side thereof for pivotal movement relative thereto between a first condition in which the leg member is positioned generally alongside the box for storage and a second condition in which the leg member extends angularly downwardly from the box for engagement of the other end section of said leg member with the ground so that as the dump box is pivitally moved between the lowered and elevated conditions and said hydraulic means maintains said other end section of said leg member in engagement with the ground, said leg member effectively braces said dump box to resist a tipping over of the dump vehicle upon one of its sides.

20. A dump vehicle as defined in claim 19 wherein said stabilizing apparatus further includes means for releasably securing said leg member in said first condition for storage.

21. A dump vehicle as defined in claim 19 wherein said hydraulic means includes a first hydraulic cylinder for telescopically moving said leg member end sections and said dump vehicle further includes a second hydraulic cylinder for pivotally moving the leg member between said first and second conditions.

22. A dump vehicle as defined in claim 19 wherein there are two leg members arranged on opposite sides of the dump box and said hydraulic means includes means for telescopically moving the end sections of each leg member as the dump box is moved relative to the frame so that when said leg members operatively engage the ground and the dump box is positioned in the elevated condition, the leg members effectively brace the dump vehicle for resisting a tipping of the dump box upon either of its sides.

23. A dump vehicle as defined in claim 22 wherein each of said leg members are pivotally connected to the dump box so that when the dump box is positioned in the elevated condition and the leg members operatively engage the ground, each of the leg members define an acute angle with the vertical when the dump vehicle is viewed endwise and theretoward.

24. A dump vehicle as defined in claim 23 wherein said defined acute angle is about fifteen degrees.

25. A dump vehicle as defined in claim 22 further including means for telescopically moving the end sections of one leg member independently of the end section of the other leg member so that said one leg member can be used without said other leg member for bracing the dump vehicle.

* * * * *